United States Patent [19]

Newby

[11] Patent Number: 4,990,890

[45] Date of Patent: Feb. 5, 1991

[54] VEHICLE SECURITY SYSTEM

[76] Inventor: Lionel L. Newby, 104 Nicholson Road, Sunward Park, Boksburg, 1460, Transvaal, South Africa

[21] Appl. No.: 317,120

[22] Filed: Feb. 28, 1989

[30] Foreign Application Priority Data

May 2, 1988 [ZA] South Africa .......................... 88/3103
Jun. 16, 1988 [ZA] South Africa .......................... 88/4296

[51] Int. Cl.⁵ .................. G08B 1/08; B60T 7/16
[52] U.S. Cl. ..................... 340/539; 340/426; 340/425.5; 340/901; 340/904; 180/167; 180/275
[58] Field of Search ........... 340/539, 425.5, 426, 340/428, 430, 531, 901–904, 825.06; 180/167, 173, 279, 275–277, 282, 283; 455/53, 54, 73, 88–90, 95, 99

[56] References Cited

U.S. PATENT DOCUMENTS 3,703,714 11/1972 Andrews ........................... 340/426
4,009,375 2/1977 White et al. ........................... 455/99
4,067,411 1/1978 Conley et al. ........................ 340/426
4,468,655 8/1984 Iwata ................................... 340/505

Primary Examiner—Donnie L. Crosland
Attorney, Agent, or Firm—Mason, Fenwick & Lawrence

[57] ABSTRACT

A security system which monitors a number of vehicles each of which includes an immobilizer and a transceiver. The system includes a number of security stations which detect signals emitted by vehicles when an unauthorized at, e.g. breaking and entering, stealing, or the like, is detected. The signals, which identify the respective vehicles, are stored, and transmitted to a base station, preferably in response to a polling signal. The affected vehicles are immobilized by means of a signal from the base station, or from one of the security stations, at an appropriate time or location. The vehicle's lights may be turned on and its hooter sounded. When the vehicle is not used within range of a security station its security station may be monitored by means of a portable receiver.

3 Claims, 2 Drawing Sheets

VEHICLE SECURITY SYSTEM

BACKGROUND OF THE INVENTION

This invention relates to a vehicle security system, a method of monitoring a plurality of vehicles, a security module for use with a vehicle, and a security station for use in a vehicle security system.

Vehicle theft is commonplace in present day society. Many approaches have been adopted to combat vehicle theft, nearly all of which are based on the use of some form of immobilizer which acts, under specific conditions, to prevent a vehicle from being driven away.

Unfortunately modern day criminals are particularly adept at neutralizing immobilizers which therefore, at best, owe their effectiveness to causing a time delay before a vehicle's immobilizer can be neutralized by a thief putting the vehicle into a condition in which it can freely be driven.

SUMMARY OF THE INVENTION

The invention is concerned in the first instance with a method of monitoring a plurality of vehicles.

According to the invention there is provided a method of monitoring a plurality of vehicles within a defined area which includes the steps, for any of the vehicles, of actuating a transmitter on the vehicle, when an unauthorized act is carried out on the vehicle, thereby to cause a first signal to be transmitted from the vehicle, detecting the first signal at a control location, and transmitting a second signal to the vehicle which causes the vehicle to be immobilized.

The second signal may be used to sound the hooter (horn), and energize the headlights, of the vehicle.

"Unauthorized act" as used herein includes one or more of the following: Unauthorized entry of a vehicle, tampering with a vehicle, unauthorized driving of a vehicle, and an unauthorized attempt to start a vehicle.

The control location may be one of a plurality of control locations located respectively at strategic positions within the defined area.

The first signal which is transmitted by the vehicle may be detected at a control location only when the vehicle is within a given or predetermined range of the control location.

The second signal which is transmitted to the vehicle may be transmitted from the control location which detects the first signal.

A third signal may be transmitted from the control location to a central location thereby to indicate that the first signal was transmitted from the vehicle, or that the second signal was transmitted to the vehicle.

The third signal may be used to identify the control location which transmits the third signal.

The third signal may identify the vehicle in any suitable way e.g. by colour, make, or registration number.

The invention also extends to a vehicle security system which includes a plurality of security stations respectively positioned at a plurality of strategic locations within an area which is to be monitored and through or in which the vehicles can move, each security station including a station transmitter and a station receiver, and each vehicle which is to be monitored including a vehicle transmitter, a vehicle receiver and detection means for actuating the vehicle transmitter, a signal which is emitted by a vehicle transmitter being received by a station receiver when the respective vehicle is within a predetermined range of the respective station, and the station transmitter thereby being actuated to transmit a first signal to the respective vehicle, which signal is received by the respective vehicle receiver.

The system may include a base and the respective station may transmit the second signal to the base in order to identify the respective station. Alternatively the base may poll the stations at intervals for information stored at the stations.

Alternatively or additionally the second signal may identify the respective vehicle which initiated the transmission of the second signal.

The vehicle may include immobilizing means, controlled by the vehicle receiver, and the vehicle receiver may be responsive to the first signal thereby to cause the vehicle to be immobilized.

The actuating means on a vehicle may be adapted to actuate the vehicle transmitter if an unauthorized act, as hereinbefore defined, is carried out on the vehicle.

Consequently if a vehicle is stolen the radio transmitter carried by the vehicle is automatically actuated and caused to transmit a signal. When such a vehicle comes within range of one of the stations the transmitted signal is detected by the receiver located at the respective station which then transmits a signal to the respective vehicle, causing the vehicle to be immobilized, and a signal to a base thereby identifying the location of the respective station.

The station may alternatively store the information and make it available to a base, when polled.

The invention also extends to a vehicle security system which includes at least one security station which is positioned at a strategic location within an area which is to be monitored and through or in which vehicles can move, the security station including a station transmitter and a station transceiver, and each vehicle which is to be monitored including an immobilizer, a vehicle transmitter, a vehicle receiver and detection means for actuating the vehicle transmitter, a signal which is emitted by a vehicle transmitter being received by the station receiver when the respective vehicle is within a predetermined range of the respective station, the station transmitter thereby being actuated to transmit a first signal to the respective vehicle, which signal is received by the respective vehicle receiver and used to actuate the immobilizer.

The security system may include memory means for storing identification data on each of a plurality of vehicles.

Preferably the detection means, for each vehicle, is adapted to detect an unauthorized act which is carried out on the vehicle.

Each vehicle may include memory means for storing identification data relating to the vehicle, the said signal which is emitted by the vehicle transmitter including the identification data.

The invention also provides a security module for use on a vehicle which includes means for detecting an unauthorized act which is carried out on the vehicle, means for transmitting a first signal to indicate the occurrence of the unauthorized act, and means for receiving a second signal, transmitted from a remote point in response to the transmitted first signal.

The security module may include memory means which is adapted to store identification data relating to the vehicle, the first signal including identification data from the memory means.

In one form of the invention the security module indicates processor means which, in response to the detection means, generates a control signal which is used to cause immobilization of the vehicle.

The security module may include indicator means and operate so that the processor means, in response to the detection means, actuates the indicator means thereby to cause a visual or audible indication of an alarm condition of the vehicle.

In a variation of the invention the security module includes processor means which, in response to reception of the second signal, generates a control signal which is used to cause immobilization of the vehicle, turn on the lights of the vehicle, sound its hooter (horn), or take or cause any other suitable action.

The security module may also include indicator means and be arranged so that the processor means, in response to reception of the second signal, actuates the indicator means thereby to cause a visual or audible indication of an alarm condition of the vehicle.

In a modified version of the invention the security module includes means for sensing the speed of the vehicle, the processor means being responsive to the speed sensing means and inhibiting immobilization of the vehicle when the speed of the vehicle is above a preset speed.

The invention further extends to a security module for use on a vehicle which includes memory means which is adapted to store identification data relating to the vehicle, means for detecting an unauthorized act which is carried out on the vehicle, processor means which is responsive to the detection means, transmitter means which is controlled by the processor means and which is adapted to transmit a first signal which includes vehicle identification data from the memory means to indicate the occurrence of an unauthorized act, and receiver means for receiving a second signal, transmitted from a remote point in response to the first signal, the processor means being responsive to the second signal thereby to generate a control signal which is used to cause at least immobilization of the vehicle.

The invention also provides a security station which includes processor means, memory means which is adapted to store identification data relating to each of a plurality of vehicles, receiver means for receiving a first signal, transmitted from a remote location, indicating the identity of a vehicle on which an unauthorized act is carried out, means for comparing the identity of the identification data stored in the memory means, and transmitter means, responsive to the comparison means, for transmitting a second signal to the remote location.

The transmitter means may be adapted to transmit the second signal if identification data, relating to the said vehicle, is stored in the memory means.

Alternatively the transmitter means may be adapted to transmit the second signal if identification data, relating to the said vehicle, is not stored in the memory means.

The security station may include display means, responsive to the first signal, for displaying the identity of the said vehicle.

BRIEF DESCRIPTION OF THE DRAWINGS

The invention is further described by way of examples with reference to the accompanying drawings in which.

DESCRIPTION OF PREFERRED EMBODIMENT

Figure 1:
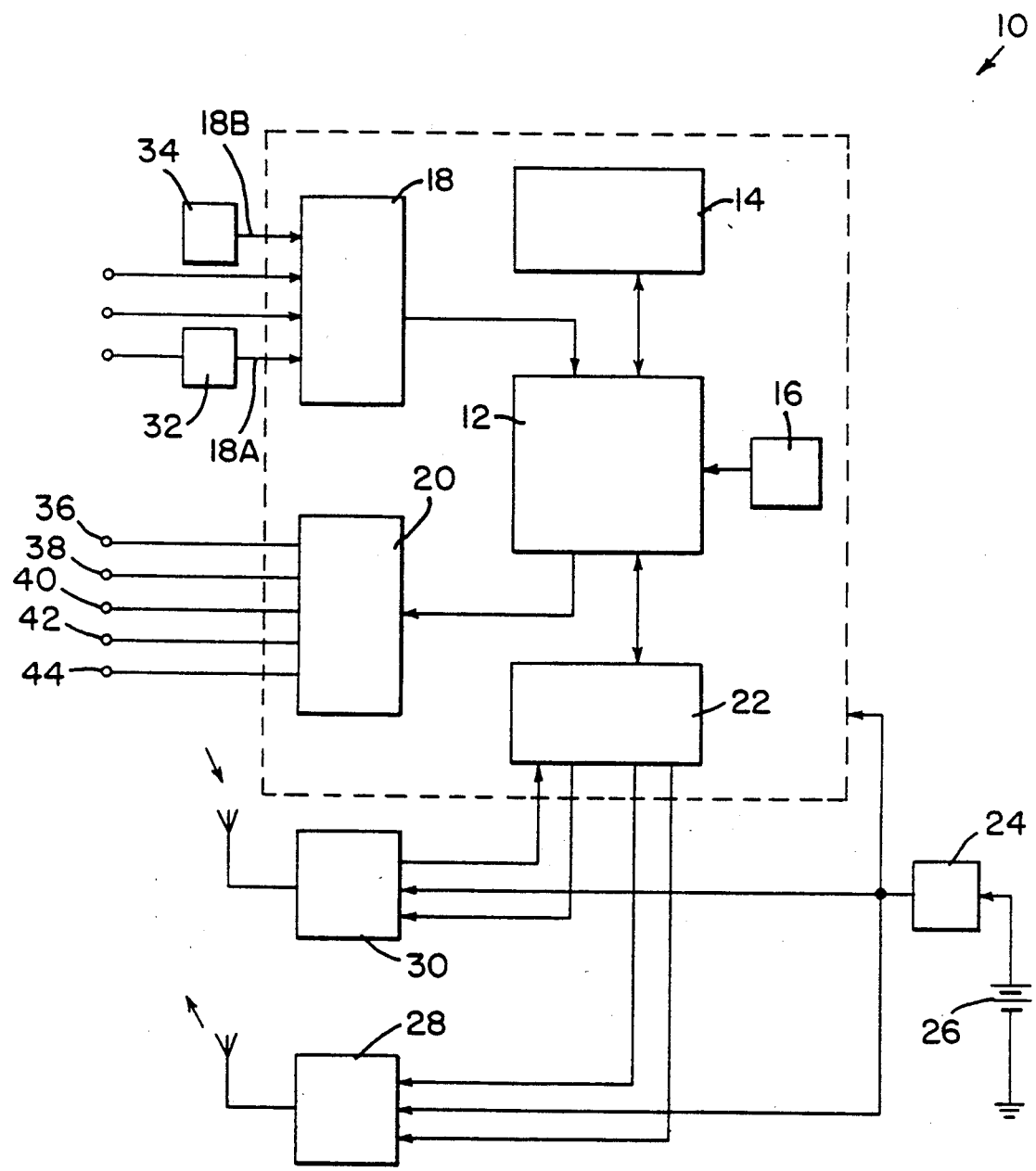
FIG. 1 schematically illustrates, in block diagram form, the construction of a security module for use on or in a vehicle in accordance with the invention.

FIG. 1 of the accompanying drawings illustrates a security module 10 for use on a vehicle, in accordance with the principles of the invention.

The module 10 includes a microprocessor 12, a semiconductor memory 14, an oscillator 16 for clocking the working of the module, an input interface unit 18, an output interface unit 20, a serial interface/control unit 22, a power supply 24 which has a battery back-up 26, a radio transmitter 28, and a radio receiver 30.

Under normal conditions the module 10 is powered directly from the power supply 24 which is conveniently connected to a battery of a vehicle in which the module 10 is installed. If for any reason the power supply fails backup is provided by the battery 26 for an extended period.

The input interface unit 18 is connected, in a conventional way, to a number of sensors which are adapted to detect the carrying out of an unauthorized act on the vehicle in question. For example one of the input terminals of the unit 18 senses any change in the voltage prevailing in the electrical system of the vehicle while a second sensor may be adapted to detect movement of the vehicle, tampering with the ignition system, or the like.

An input terminal 18A may be used, if desired, for a hand held socket connection which, via an encoder 32 may be used, when desired, to immobilize the vehicle.

In one variation of the invention the input interface unit 18 has a terminal 18B which is connected to a speed sensor 34. This sensor detects the speed of the vehicle and provides a proportional signal to the module.

The output interface unit 20 is connected, also in a known way, to a plurality of indicators to indicate an alarm condition, under certain circumstances. For example the interface unit may be connected to a visual indicator such as a light emitting device 36, an audible indicator such as a buzzer 38, to the lights 40 of the vehicle, to the hooter 42 of the vehicle, and to a coil or an immobilizer 44 of the vehicle. It is pointed out that connections of this type, and the construction of a suitable immobilizer, are known to persons skilled in the art and for this reason these details are not described fully in this specification.

The memory 14 is encoded in a known way, with data which identifies the vehicle in which the module 10 is stored. The data may for example include information on the vehicle make and model, its colour, and its registration number. Other data may be added as required and the data which is stored is not restricted to the items specifically mentioned.

The radio transmitter 28, when actuated in a manner which is hereinafter described, is adapted to emit a signal, at a relatively low power which contains information, extracted from the memory 14, sufficient to identify the vehicle which carries the module.

The radio receiver 30 is adapted to receive radio signals, in a manner hereinafter described, and to transfer information extracted from such signals to the processor 12.

Figure 2:
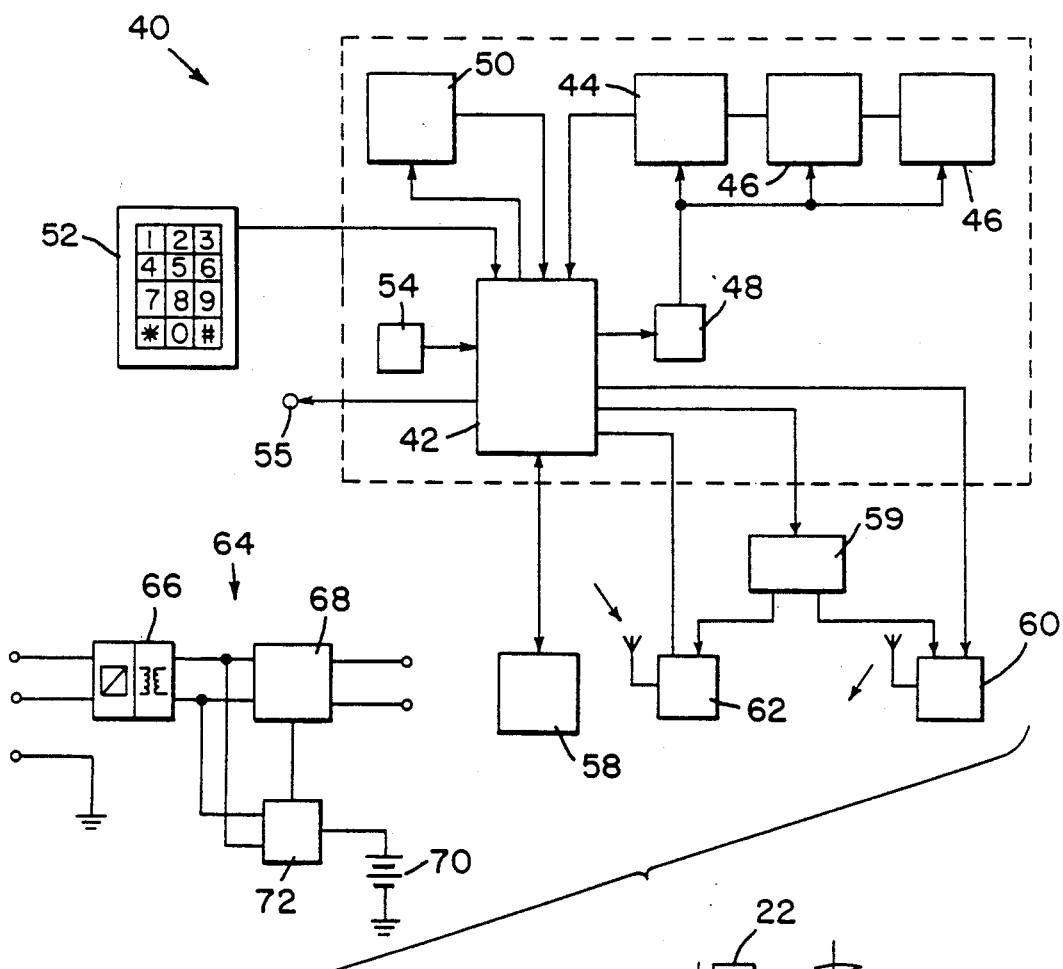
FIG. 2 is a schematic illustration, also in block diagram form, of a security station for use in the invention, and FIG. 3 schematically illustrates the working of a vehicle security system.

FIG. 2 of the accompanying drawings illustrates, in block diagram form, the circuit construction of a security station 40 for use in the vehicle monitoring system of the invention.

The security station includes a microprocessor 42 with a programmed memory 44, a data memory 46, a memory control unit 48, and a software "watchdog" 50 which monitors programmed execution by the processor 42. In the event of the processor executing invalid instructions a reset pulse is provided by the watchdog unit 50 to overcome faulty operation.

Data can be input to the processor 42 by means of a key pad 52.

The processor is clocked by means of an oscillator 54.

The processor can actuate an audible indicator 56, and energize a visual display 58.

The processor is connected via a controller 59 to, and controls the operation of, a radio transmitter 60 and a radio receiver 62, Data can be input from the receiver 62 to the processor 42.

The security station 40 is powered by means of a power supply 64 which includes a mains-powered transformer 66 which, via a power supply 68, directly supplies power to the security station, and, at the same time, charges a battery 70 through a battery charger 72, in order to provide a back-up supply.

Figure 3:
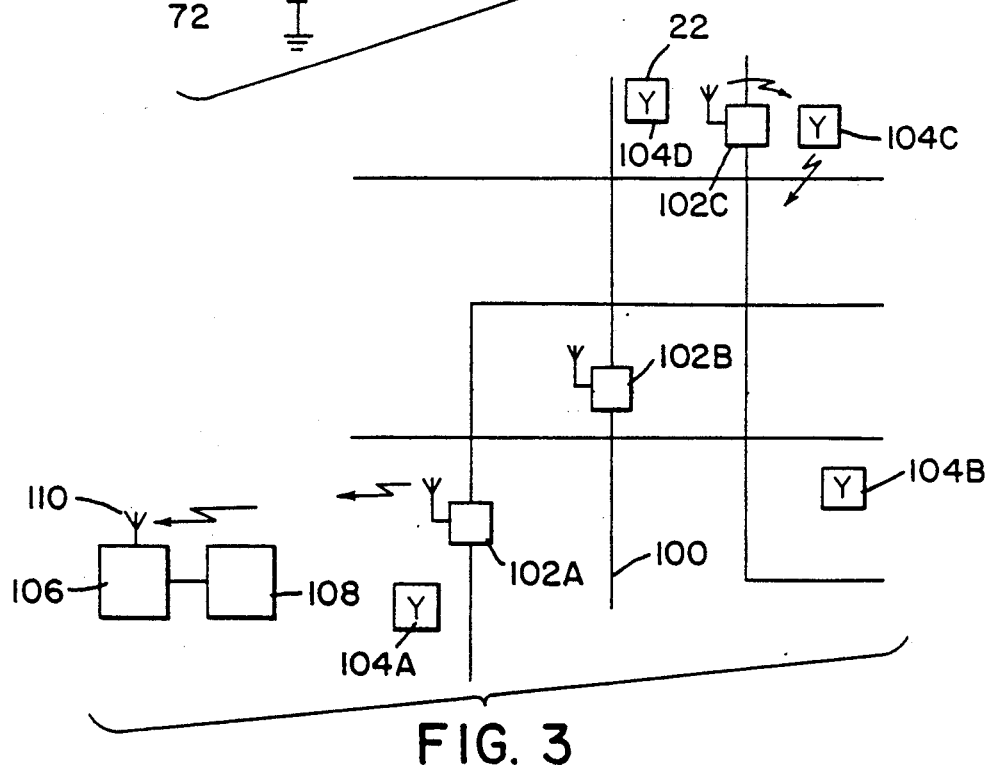

FIG. 3 of the accompanying drawings schematically illustrates a road grid 100, a plurality of vehicles 102A, 102B and 102C, which are free to move over the roads of the grid 100, a plurality of stations 104A, 104B, 104C and 104D which are located at strategic locations adjacent certain of the roads within the grid 100, a base station 106 and a control computer 108 which is located at the base station 106.

Each of the vehicles 102 is equipped with a vehicle immobilizer which may be of any suitable or conventional type. Such an immobilizer typically is under the control of some mechanism mounted on the vehicle or under the direct supervision of the driver of the vehicle. For example immobilizers are known in the art which are automatically armed when an ignition key is withdrawn from an ignition lock. Other types of immobilizers are armed by virtue of a positive act on the part of the driver, for example by actuating a hidden switch.

As has been pointed out in the introduction to this specification many immobilizers can be neutralized by experienced criminals and therefore offer, at best, a delay period before neutralization. Once an immobilizer is neutralized the vehicle can of course be stolen.

Each of the vehicles 102, which is to be monitored, carries a security module 10 of the kind shown in FIG. 1. It has already been pointed out that the transmitter 28 of each module 10 puts out a lower power only and thus the signals which are transmitted are detectable only when the vehicles in question are within close range of a suitable receiver.

Each station 104 has a security station 40, of the kind shown in FIG. 2, installed at it. The receiver 62 of a security station 40 is adapted to receive a signal which is transmitted by the transmitter 28 of a module 10. The transmitter 60 of a security station 40 is capable of transmitting a signal, which is relatively low powered, and which is at a frequency which can be detected by the receiver 30 of a module 10. Each transmitter 60 is, optionally, also capable of transmitting a second signal, which is relatively high powered and which can be detected by a receiver, designated 110, located at the base station 106.

The respective second signals which are transmitted by the various transmitters 60 are either at distinct frequencies or otherwise are encoded so that they identify the stations 104 from which such signals are transmitted. The control computer 108 is capable of handling this information thereby to provide a display for example a hard copy print-out which makes visible the identity and location of each of the stations which transmits a signal to the base station.

The transmitters 28 on each vehicle may be actuated in any suitable way. In one example of the invention each transmitter, i.e. each module 10, is under the control of a switching device such as a hand held encoded unit which is engagable, in an known way, with a set of contacts leading to the decoder 30. Alternatively use may be made of a concealed switching device such as a reed switch or the like which is operated when a driver enters a vehicle. Clearly an unauthorized person not having a suitable encoded unit, nor knowing of the position of a switching device or indeed of its existence is unable to operate the switch and hence neutralize the module 10. Thus for example if a thief neutralizes a vehicle immobilizer the thief will be able to drive the vehicle. However if the thief is unaware of the existence of the module 10 then the transmitter 28 commences transmitting a signal automatically when the vehicle is started, or moved, or, more generally put, when an unauthorized act is carried out.

It has already been pointed out that the interface unit 18 responds to any unauthorized act for example a door switch being actuated, the ignition of the vehicle being tampered with, and the like.

The signal which is transmitted by the transmitter 28 is of a relatively low power. Thus such a signal is detectable by means of a receiver 62, at one of the stations 104, only when the vehicle in question is within a predetermined range of the station.

When a signal which is transmitted by a vehicle is detected by a station 104 two events take place. Firstly a signal is transmitted by the transmitter 28 at the respective station 104 directly to the vehicle concerned. This signal is also of a low power and so is normally detectable only by the intended vehicle. The vehicle concerned must be within a predetermined radius of the transmitter 60 in order to receive the transmitted signal.

Secondly, by means of an interlock mechanism between the vehicle's transmitter 28 and the vehicle's receiver 30, an arrangement is achieved whereby the vehicle's receiver 30 is responsive to the signal transmitted from the station 104 i.e. the station module 40, only if the vehicle's transmitter 28 is actuated. This gating system prevents a vehicle which is not being driven in an unauthorized way, or by an unauthorized person, from detecting and thereby responding to a signal from the respective station 104.

The vehicle's receiver 130, upon detecting a transmitted signal in the manner described, is used to immobilize the vehicle. Thus within the module 10 the processor 12 generates a signal which, via the output interface unit 20, causes the visual indicator 36 to be illuminated, the buzzer 38 to be sounded, the lights 40 and the hooter 42 of the vehicle to be energized, and the immobilizer 44 of the vehicle to be actuated.

The end result is that, in accordance with the described procedure, the vehicle is immobilized and very clearly audibly and visually identified, while it is within a predetermined range of the associated station 104. Thereafter the vehicle remains immobilized.

Secondly a signal is optionally transmitted by the station 104 to the base station 106. At the base station the signal is applied to the control computer 108 which, in a manner which has already been described, generates a signal or a display which identifies the location of the station 104 which transmitted the signal. The signal also contains data to identify the vehicle, e.g. its registration number, its colour, make, model, etc. Control personnel at the computer 108, or mobile personnel, are thereafter immediately alerted and are directed to the station 104 to take appropriate action.

The invention lends itself to a number of variations and modifications. For example a mobile station which is equivalent to the station 40 can be carried by a driver of a vehicle thereby to control the vehicle, in a manner analagous to that described. In this form of the invention the driver, who is carrying the station 40, will be immediately alerted to the fact that his vehicle has been subjected to an unauthorized act. It is apparent that responsible authorities e.g. police, can be alerted in a similar way, to take appropriate action where necessary.

In another variation of the invention it is possible for each vehicle to transmit a signal which identifies the vehicle and for this information then to be relayed to the base station 106.

As has been pointed out the information can be directly transmitted to the base station. Alternatively the information can be stored at the respective station and relayed to the base station in response to a polling signal from the base station. Polling techniques are known, and thus are not further described. The adoption of a polling technique makes it easier to control the transmission of information.

As the various transmitters and receivers 28 and 30, and 58 and 62, are low powered, and as there is a need to identify the location of each transmitter 60 which is actuated in the described manner, it follows that, in order to monitor a predetermined area which includes a high density of roads, a large number of the stations 104 must be employed. The stations will however be situated at strategic locations for example adjacent access roads, bridges, subways or the like leading to or from the area which is t be monitored. Almost invariably when a vehicle is stolen a thief drives the vehicle from the immediate area at which the theft took place. Thus it is highly likely that a stolen vehicle will be driven past one of the strategically located stations 104.

The invention as has been described lends itself particularly to the monitoring of a confined area such as a parking lot or parking ground at a shopping centre or the like. With this form of the invention security stations 40 are installed at each of a number of strategic locations around the parking area. For example the parking area may be serviced by two or three entrances and exits and, at each such entrance and exit a security station 40 is installed. The fact that the parking ground is serviced by the security system of the invention is advertised and users of the parking ground are then encouraged to equip their vehicles with modules 10 of the kind shown in FIG. 1.

Users of the modules have the identities of their vehicles, in which the modules are installed, recorded at a central bureau. This identity information is available to each of the stations 40 and is recorded in the respective memories 46. In the event that the users of the system pay for the benefit of being part of the security system, for example on a monthly or other subscription basis, then the state of each user's subscription may be recorded in the data memory 46 as well. Alternatively the defaulting users i.e. those who have not paid subscriptions, are recorded in the memories 46.

Data may be input via the processor 42 to the memories 46 from the key pad 52.

Assume that, within a monitored parking area of the kind described, a vehicle is stolen or subjected to an unauthorized act, of the kind described. The vehicle may for example include a primary immobilizer which a skilled thief may neutralize. The thief is then able to start and drive the vehicle. Despite the fact that the primary immobilizer is neutralized the monitoring system of the module 10, which is connected to the input interface unit 18, detects the commissioning of an unauthorized act. A warning signal, which carries data identifying the vehicle in question, is then transmitted by the transmitter 28 of the module 10.

When the vehicle comes within range of a security station 40, and this will normally happen when the vehicle approaches say an exit road from the parking ground in question, the transmitted signal is received by the receiver 62 and information extracted from the signal is fed to the processor 42. The information, which identifies the vehicle, is compared to data held in the memories 46.

If subscription payments are up-to-date, for the vehicle in question, then, in one example of the invention, the vehicle's identification data will not be found in the memory 46. This indicates that protection is to be provided for the vehicle and a signal is thus transmitted by the transmitter 60 to the receiver 30 of the module 10. Upon reception of the transmitted signal the processor 12 causes an alarm condition to be indicated on the devices 36 to 42, and the vehicle is immobilized via the output 44, in the manner described.

On the other hand if a comparison is made between the received vehicle identification data and that stored in the memories 46 and it is found that the subscriptions of the vehicle in question have not been paid then no action is taken and the vehicle is ignored. When an alarm condition is sounded then, at the security station 40, the registration number of the immobilized vehicle appears on the display 58 and the audible alarm 56 is sounded to alert an operator to the current situation. Appropriate further action can then be taken if necessary.

It has already been pointed out that the operator can input data to the processor 42 from the key pad 52. If the operator correctly logs on to the system then vehicle registration information can be inserted into or deleted from the memories 46. In this way the status of the system can regularly be updated. Once an operator has completed his task he logs off and it is thereafter not possible to change the data in the memories 46.

As has already been pointed out the system of the invention lends itself to a number of variations and modifications. The essence of the invention however lies in the technique of generating a signal when an unauthorized act takes place, of identifying the source of the signal and of then taking action, to immobilize the vehicle concerned, under certain conditions.

Referring for example to FIG. 1 a speed sensor 34 is shown as being connected to the input interface unit 18. If a vehicle is driven at a high speed, and immobilized, dangerous or fatal consequences can ensue. To minimize this danger the speed sensor 34 can override the immobilizing action of the module 10 and permit a vehicle to be immobilized only when its speed drops below a predetermined speed.

Many other variations and modifications can be made to the principle described herein but without departing from the scope of the present application. For example if a vehicle user parks at a location which is not monitored in the way described then use may be made of a portable receiver which indicates that an alarm condition has arisen. This portable receiver may be used at home, when visiting, near an office, or at work, or the like, to provide a monitoring facility which directly alerts the user of an alarm condition. The receiver, which has a limited range, say of the order of 200 m, may be programmable to accept signals from a number of vehicles, in each instance displaying the vehicle's registration number. Consequently, provided a person can park close to the location of the receiver an effective monitoring of the person's vehicle can take place.

I claim:

1. A vehicle security system, comprising:
   (a) a plurality of security stations which are respectively positioned at strategic locations within an area to be monitored and trough or in which vehicles can move, each security station including:
      (1) a station transmitter, and
      (2) a station receiver; and
   (b) the following elements included within each vehicle which is to be monitored:
      (1) memory means for storing identification data relating to the vehicle,
      (2) a vehicle transmitter connected to the memory means,
      (3) a vehicle receiver,
      (4) detection means which is adapted to detect an unauthorized act which is carried out on the vehicle and which then actuates the vehicle transmitter, and
      (5) an immobilizer;
   wherein a signal is emitted by a vehicle transmitter of a particular vehicle in which the unauthorized act is carried out, the signal including the identification data on the particular vehicle; and wherein the signal from the particular vehicle is received by the station receiver of a particular one of the security stations when the particular vehicle is within a predetermined range of the particular security station; and
   (c) a base station which polls the security stations at time intervals, the station transmitter of the particular security station transmitting information to the base station when polled, which information includes at least the particular vehicle's identification data and the location of the particular security station; wherein the station transmitter of the particular security station is then actuated by a signal from the base station to transmit a first signal to the vehicle, which first signal is received by the vehicle receiver of the vehicle and is used to actuate the immobilizer of the vehicle to thereby stop the vehicle within the predetermined range of the security station;
   wherein the security station which is the particular security station substantially determines the location of the vehicle within the area to be monitored.

2. A vehicle security system according to claim 1, wherein each of the security stations includes security station memory means for storing identification data on each of a plurality of vehicles.

3. A method of monitoring a plurality of vehicles within a defined area using the vehicle security system of claim 1, which method includes the steps, for any of the vehicles, of:
   actuating a transmitter on the particular vehicle when an unauthorized act is carried out on the particular vehicle, thereby to cause an unauthorized act signal to be transmitted from the particular vehicle,
   detecting the unauthorized act signal at a particular control location, the particular vehicle being within a sub-area within the defined area, the sub-area substantially determined by a range of the particular control location, and
   transmitting a second signal from the particular control location to the particular vehicle within the sub-area, which second signal causes the vehicle to be immobilized.

* * * * *